United States Patent [19]

Reid et al.

[11] Patent Number: 5,341,559
[45] Date of Patent: Aug. 30, 1994

[54] METHOD AND APPARATUS FOR SECURING A TUBULAR BUSHING IN A CIRCULAR OPENING

[75] Inventors: Leonard F. Reid, Bellevue; Roger T. Bolstad, Seattle, both of Wash.

[73] Assignee: Fatigue Technology, Inc., Seattle, Wash.

[21] Appl. No.: 47,108

[22] Filed: Apr. 13, 1993

[51] Int. Cl.⁵ .................................................. B21D 39/00
[52] U.S. Cl. ...................................... 29/523; 29/522.1; 29/282; 29/283.5; 29/898.07
[58] Field of Search ................ 29/282, 283.5, 507, 29/522.1, 523, 890.044, 898.07; 72/370, 393

[56] References Cited
U.S. PATENT DOCUMENTS

| | | | |
|---|---|---|---|
| 3,566,662 | 3/1971 | Champoux | 72/370 |
| 3,665,591 | 5/1972 | Kowal | 29/507 |
| 3,665,744 | 5/1972 | Harter | 72/129 |
| 4,713,870 | 12/1987 | Szalvay | 29/402.09 |
| 5,012,566 | 5/1991 | Getz, Jr. | 29/265 |
| 5,083,363 | 1/1992 | Ransom et al. | 29/523 |
| 5,103,548 | 4/1992 | Reid et al. | 29/507 |
| 5,127,254 | 7/1992 | Copple et al. | 72/370 |
| 5,129,253 | 7/1992 | Austin et al. | 72/370 |

*Primary Examiner*—Mark Rosenbaum
*Assistant Examiner*—S. Thomas Hughes
*Attorney, Agent, or Firm*—Delbert J. Barnard

[57] ABSTRACT

A tubular bushing (68) is positioned into an opening (88) in a member (84). An axially split expansion sleeve (66) is placed onto a small diameter portion (54) of an extended mandrel (10). The mandrel (10) includes an increasing diameter portion (56) and a maximum diameter end portion (58) endwise from the small diameter portion (54). The maximum diameter portion (58) is sized to fit through the tubular bushing (68). The expansion sleeve (66), while on the small diameter portion (54) of the mandrel (10) can also fit through the bushing (68). The sleeve (66) is placed on the small diameter portion (54) of the mandrel (10) with its inner end (76) against the end (78) of a sleeve positioner (40). A tubular nosepiece (16) surrounds the sleeve positioner (40), and extends axially beyond the end surface (78). The mandrel (10) is inserted through the bushing (68) while the bushing (68) is within opening (92). The mandrel (10) is moved to place the sleeve (66) within the bushing (68), and an end surface (41) of the nosepiece (16) against a surface portion (84) of the workpiece (88). At the same time, the end surface (43) of a nosepiece extension (39) is positioned against an end surface (82) of the bushing (68). The mandrel (10) is then pulled through the sleeve (66). Movement of the increasing diameter portion (56) and the maximum diameter portion (58) through the sleeve (66) imposes a radially outwardly directed force on the sleeve (66), causing the sleeve (66) to expand. The expanding sleeve (66) exerts a radially outwardly directed force on the bushing (68). In response, the bushing (68) is expanded radially into a secure interference fit within the opening (92) in the workpiece (88).

4 Claims, 2 Drawing Sheets

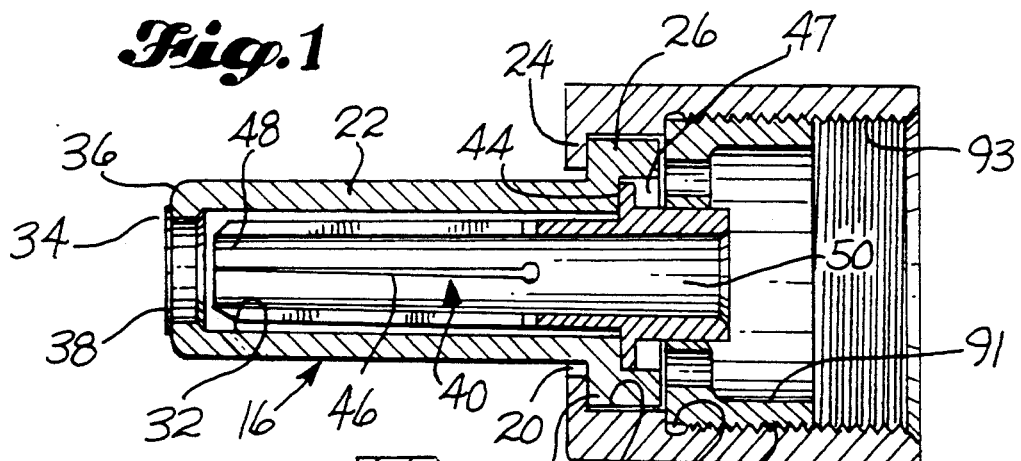
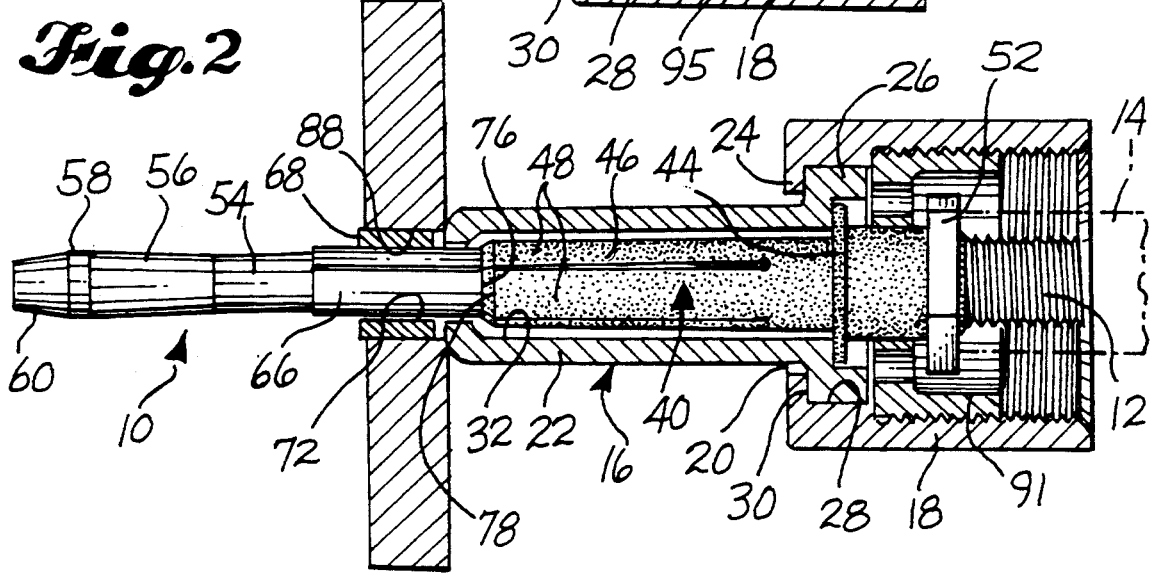
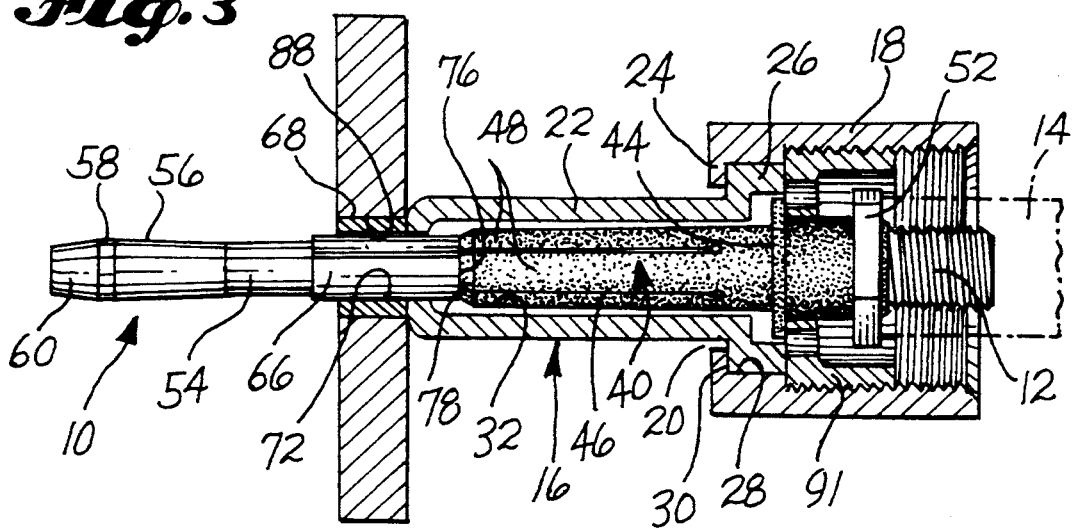

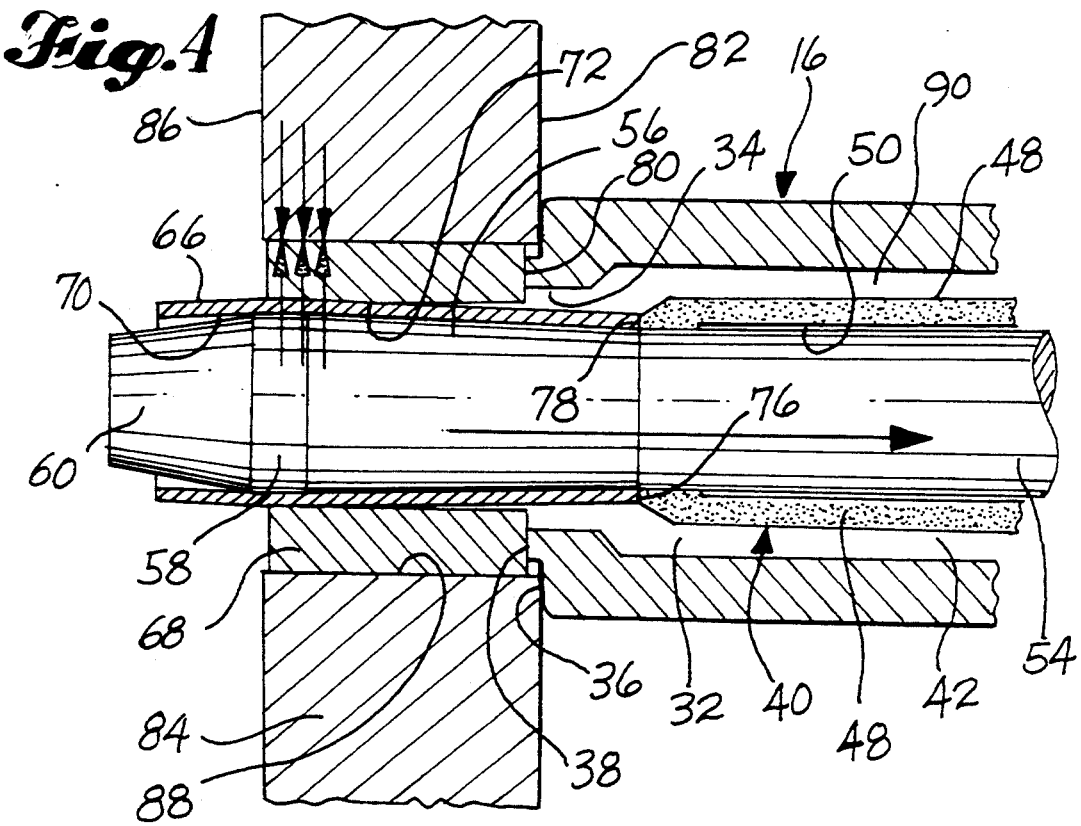
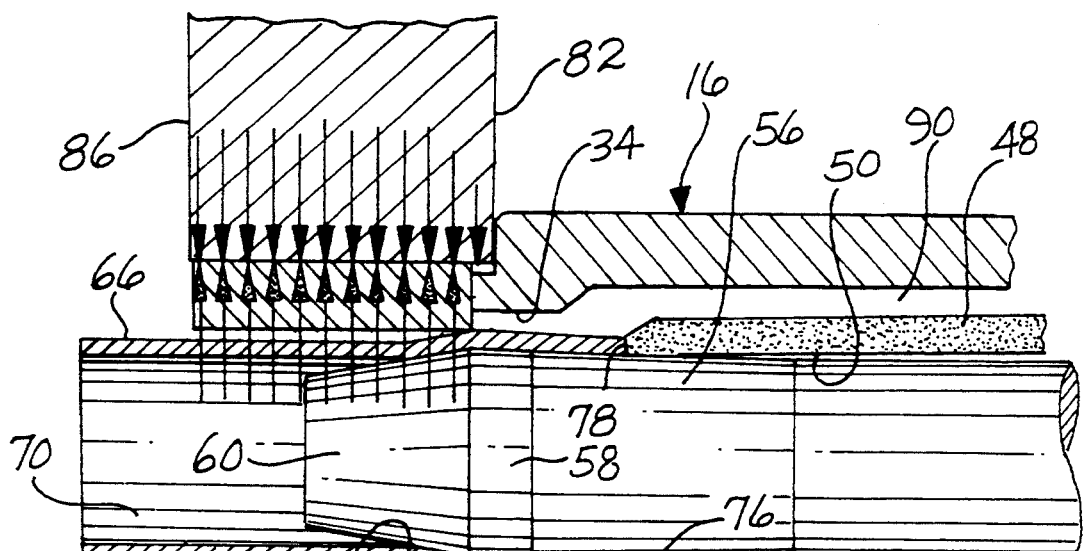

METHOD AND APPARATUS FOR SECURING A TUBULAR BUSHING IN A CIRCULAR OPENING

TECHNICAL FIELD

The present invention relates to the installation of tubular bushings in openings in structural members. More particularly, it relates to the provision of an installation method and apparatus utilizing a mandrel and a lubricated split sleeve for radially expanding the bushing in an opening to create a tight interference fit between the bushing and the opening.

RELATED PATENT

The present invention is an improvement on the invention disclosed in our U.S. Pat. No. 5,103,548, granted Apr. 14, 1992, and entitled Method And Apparatus For Securing A Tubular Bushing In A Circular Opening.

BACKGROUND ART

As stated in the aforementioned U.S. Pat. No. 5,103,548, it is known to secure a bushing within an opening in a structural wall by positioning the bushing within the opening, holding it in place, and then forcing an expansion mandrel through the center of the bushing to radially expand the bushing into an interference fit with the opening. A lubricant must be applied to the contacting surfaces of the mandrel and bushing. If insufficient lubricant is applied, the mandrel can become stuck in the bushing. Also, the mandrel imposes an axial force on the bushing, sometimes causing undesirable galling and/or deformation of the bushing. The principal object of the present invention is to provide a method and apparatus for causing radial expansion of a bushing with controlled axial movement of the bushing. Another object of the present invention is to use a lubricated split sleeve between the mandrel and the bushing to absorb the axial forces and permit bushing installation from one side of the workpiece. A split sleeve may be of the type disclosed in Louis A. Champoux, U.S. Pat. No. 3,566,662, granted Mar. 2, 1971, or in Claire M. Harder, U.S. Pat. No. 3,665,744, granted May 30, 1972. The prior art use of these split sleeves is for cold expansion of metal immediately surrounding an opening for fatigue life enhancement.

DISCLOSURE OF THE INVENTION

According to the method, a mandrel is provided which includes, in series, an inner end connector portion, a small diameter portion, an increasing diameter portion, and a maximum diameter portion. A one piece split sleeve is positioned on the small diameter portion of the mandrel. A tubular bushing having a substantially constant outside diameter and a substantially constant inside diameter is positioned on the split sleeve. The mandrel, the split sleeve and the bushing are inserted into a circular opening in a member. The split sleeve and the bushing are held in a fixed axial position within the opening and the mandrel is moved axially to move first the increased end diameter portion and then the maximum diameter portion of the mandrel axially through the sleeve. The mandrel expands the split sleeve radially and the expanding sleeve imposes a radially outwardly directed force in the bushing. The mandrel and the split sleeve are dimensioned such that the radial expansion of the split sleeve exerts sufficient radial forces on the bushing to plastically expand the bushing and place the sidewall of the opening into tight gripping contact with the outer surface of the bushing. The split sleeve is removed from the bushing after the mandrel has passed through the split sleeve. The tubular bushing is left within the opening, firmly secured to the sidewall of the opening. The inner end of the split sleeve is against the outer end of a longitudinally split tubular sleeve positioner, located within a nosepiece, and initially surrounding the small diameter of the mandrel. The initial pull on the mandrel moves the sleeve positioner rearwardly. At the same time, it moves the split sleeve and bushing further into the opening in the structural member. The bushing moves until its end contacts an end portion of the nosepiece. When this happens, the bushing stops moving. The sleeve continues to move with the sleeve positioner.

In preferred form, the mandrel is pulled through the split sleeve by use of a puller tool including a nosepiece having an outer end surface which contacts both an end of the bushing and a surface portion of the member in which the opening is formed, immediately about the opening. The sleeve is internally lubricated by a drive film lubricant. The puller tool includes a sleeve positioner within the nosepiece. The sleeve positioner has a forward end which contacts a confronting end of the sleeve. A rear portion of the sleeve positioner includes an annular flange. This flange is located within a chamber formed in an inner end portion of the nosepiece. Initially, this flange is against a forward end surface of the chamber. The initial pull of the mandrel moves the sleeve positioner rearwardly until the flange contacts a rear end surface of the chamber. As the mandrel moves, it moves the split sleeve and bushing with it. The bushing is moved until its end confronting the nosepiece contacts an end portion of the nosepiece.

Other objects, features and advantages of the invention will be hereinafter disclosed in some detail, as a part of the description of the best mode of the invention.

BRIEF DESCRIPTION OF THE DRAWINGS

In the drawings, like reference numerals are used to designate like parts throughout the several views, and:

FIG. 1 is a longitudinal sectional view taken through a nosepiece, a sleeve positioner within the nosepiece, a screw on nose cap, and a retainer nut within the nose cap;

FIG. 2 is a fragmentary longitudinal sectional view showing the tooling and a bushing at the start of the method, with the mandrel, the sleeve and the sleeve positioner shown in side elevation, such view showing the tooling in a start position and the bushing only partially in the opening;

FIG. 3 is a view like FIG. 2, but showing the tooling following an initial retraction of the mandrel which moves the sleeve positioner rearwardly and pulls the bushing into the opening and into contact with an outer end portion of the nosepiece;

FIG. 4 is a fragmentary longitudinal sectional view, on an enlarged scale of the tooling at a stage in which the increasing diameter portion of the mandrel has been pulled part way into the sleeve and bushing; and FIG. 5 is a view like FIG. 4, but showing the large diameter portion of the mandrel almost completely through the sleeve and bushing.

BEST MODE FOR CARRYING OUT THE INVENTION

The total content of U.S. Pat. No. 5,103,548 is hereby incorporated herein by this specific reference.

Referring to FIGS. 1-5, a mandrel 10 is connected at its inner end 12 to a piston 14 (FIGS. 2 and 3) within a puller tool. The puller tool includes an elongated nosepiece 16 which is secured to the front end of the puller tool by means of a retainer ring or nosecap 18. Ring 18 includes an end opening 20 through which an elongated tubular nose portion 22 of the nosepiece 16 extends. Opening 20 is surrounded by an annular flange 24. The nosepiece 16 includes an annular base 26 which is located within a chamber 28 in retainer ring 18, with its radial surface 30 against the radial inner surface of the flange 24. Tubular portion or body 22 projects forwardly from the annular base 26. As best shown in FIGS. 5-7 of the aforementioned U.S. Pat. No. 5,103,548, the tubular portion 22 is a one-piece tubular member including a sidewall of substantial thickness. Tubular portion 22 includes a central passageway 32. In preferred form, the outer end of tubular portion 22 includes a central annular projection 34 which immediately surrounds the central passageway 32. An annular end surface 36 immediately surrounds projection 34. Projection 34 has an end surface 38 which is spaced axially forwardly of surface 36. A sleeve positioner or abutment 40 is positioned within the nosepiece 16. Sleeve positioner 40 includes an axially split tubular portion 42 which is disclosed within passageway 32. An annular flange 44 is provided at the inner end of member 40. Longitudinal slits 46 (e.g. 6) divide tubular member 42 into a like number of longitudinal segments or fingers 48. The fingers 48 are preferably clamped to pull their outer ends together. Then, the sleeve positioner 40 is heat treated to fix the fingers 48 in position. Tubular member 42 includes a central passageway 50.

Base 26 of nosepiece 16 includes an annular chamber 47. Chamber 47 has an inside diameter slightly larger than the outside diameter of flange 44. Chamber 47 has an axial length which in preferred form is two or maybe three times longer than the thickness of flange 44.

The mandrel 10 includes, in series, the inner end portion 12, a flange 52, a small diameter portion 54, an increasing diameter portion 56, a maximum diameter portion 58 and a converging end portion 60. Flange 52 includes wrench flats by which it can be gripped by the jaws of a wrench. End portion 12 is threaded for connection to a threaded socket in the outer end of the piston portion 14 of the puller tool. A wrench is applied to the wrench flats and is turned to tighten or loosen the connection.

As shown in FIG. 2, when the piston 14 is extended, the converging end portion 60 and the maximum and increasing diameter portions 58, 60 of the mandrel 10 are positioned endwise outwardly of the nosepiece 16. The small diameter portion 54 of the mandrel 10 extends through passageway 50 in member 40. An O-ring (not shown) may be positioned between flange 52 and a radial end surface of the piston 14.

The above-described tooling is well pictured and described in the aforementioned U.S. Pat. No. 5,103,548. In most respects, the tooling is similar to tooling that is described in detail in Louis A. Champoux, U.S. Pat. No. 4,425,780, granted Jan. 17, 1984. The puller tool is disclosed in detail in Louis A. Champoux, U.S. Pat. No. 4,187,708, granted Feb. 12, 1980. The contents of these patents are incorporated herein by this specific reference.

Referring to FIGS. 2-5, the apparatus of the invention also includes a one piece split sleeve 66 and a tubular bushing 68. Split sleeve 66 includes a center passageway 70 and bushing 68 includes a center passageway 72. As disclosed in the aforementioned U.S. Pat. No. 3,566,663, the inside of sleeve 66 is coated by a suitable film lubricant, e.g. a composition of lead oxide, graphite and molybdenum disulfide.

A puller tool is operated to extend the mandrel 10 into the position shown by FIG. 2. A split sleeve 66 is then moved endwise onto the small diameter portion 54 of the mandrel 10. The bushing 68 is then moved endwise of the mandrel 10 and onto the split sleeve 66. The split allows the split sleeve 66 to expand in diameter as it is being moved over first the converging end portion 60, then the maximum diameter portion 58, and then the increasing diameter portion 56, of mandrel 10. The split sleeve 66 acts much like a spring. The stored energy in sleeve 66 causes the sleeve 66 to contract once it is on the small diameter portion 54 of the mandrel 10.

When sleeve 66 is on the small diameter portion 54 of mandrel 10, it has an outside diameter that is smaller than the maximum diameter portion 58 of mandrel 10 and also smaller than the central passageway 72 in the bushing 68. Passageway 72 in bushing 68 is slightly larger in diameter than the maximum diameter portion 58 of mandrel 10. Thus, after the split sleeve 66 has been installed on the small diameter portion 54 of mandrel 10, the bushing 68 can be slid endwise of the mandrel 10 and positioned on the sleeve 66, into the position shown by FIG. 2.

As shown by FIG. 2, split sleeve 66 extends into the nose portion 22 of nosepiece 16 and at its inner end 76 abuts the outer end 78 of sleeve positioner 40. The abutment of sleeve end 76 with sleeve positioner end 78 prevents endwise movement of the sleeve 66 into the nosepiece 16, when the mandrel 10 is being retracted. As best shown by FIG. 4, end surface 38 contacts bushing end surface 80 and surface 36 contacts surface portion 82 of wall 84. The purpose of protrusion 34 is to hold the bushing 68 into an underflush position with respect to the surface 82. Surface 82 is on the first side of member 84 which includes a second or opposite side 86. The bushing 68 has an outer diameter which is sized to snugly fit within an opening 88 which has been drilled in member 84. Opening 88 extends perpendicular to member 84, between the first side 82 and the second side 86.

The central passageway 32 and nose portion 22 is spaced radially outwardly from the periphery of tubular portion 42 when the small diameter portion 54 of mandrel 10 is within the tubular portion 42 of sleeve abutment 40. Thus, an annular space 90 initially exists between the tubular portion 42 and the main body of nose portion 22. The radial dimension of this space 90 is large enough to permit a radial expansion of the tubular portion 42 in response to movement of first the increasing diameter portion 56, and then the maximum diameter portion 58, of a mandrel 10, into the axially split tubular portion 42. This happens near the end of the red traction stroke of the mandrel 10. See FIG. 5.

Sleeve positioner 40 is positioned within nosepiece 16, with flange 44 placed in cavity 47, as described above. Then, a retainer ring 91 is installed inside of the mounting ring 18. Mounting ring 18 has an internally threaded large diameter portion 93 which terminates at its forward end at a radial flange 95. Retainer nut 91 has external threads which mate with the internal threads in opening 93. The retainer nut 91 is rotated until its inner surface is against flange 95. In a known manner, the front wall of nut 91 includes openings for receiving a tool used for rotating the nut 91. When nut 91 is against shoulder 95, the front wall of nut 91 forms a rear boundary for cavity 47. As will hereinafter be described, sleeve positioner 40 is movable axially between a forward position (FIG. 2) in which flange 44 is against the radial surface of the socket in base 26 and a rear position in which the flange 44 is against the forward end of nut 91.

The method of the invention will now be described. The split sleeve 66 is positioned on the extended mandrel 10, and the bushing 68 is positioned on the split sleeve 66, as described above. Then, the outer end of mandrel 10 is aligned with the opening 88 and the puller unit is moved towards member 84, to move the mandrel 10, sleeve 66 and bushing 68 into the opening 88. Or, bushing 68 may be first set into opening 88 followed by a movement of sleeve 66 and mandrel 10 into the bushing 68. The puller tool 14 is moved forwardly until end surface 38 on nosepiece 16 abuts or is adjacent end surface 80 on bushing 68 and end surface 66 abuts surface 82 of member 84. FIG. 2 shows a typical position in which the bushing 68 is not quite in the desired position and its inner end surface 80 is spaced from end surface 38. Next, the puller tool is operated to pull or retract the mandrel 10 into the nosepiece 16. There is frictional engagement between small diameter portion 54 of mandrel 10 and sleeve positioner 40, between sleeve 66 and small diameter portion 54 of mandrel 10 and between bushing 68 and sleeve 66. The initial retraction of mandrel 10 moves with it the sleeve positioner 40, the sleeve 66 and the bushing 68. This is due to the just described frictional engagement. Sleeve positioner 40 moves rearwardly until flange 44 is against the front end of nut 91, then it stops. Bushing 68 moves rearwardly until its inner end surface 80 is against end surface 38 on nosepiece 36, then it stops. Sleeve 66 moves with mandrel 10 until its inner end 76 is against outer end 78 on sleeve positioner 40, then it stops. The amount of axial movement provided for flange 44 is usually greater than the start axial distance between end surface 80 on bushing 68 and end surface 38 on nosepiece 16. Thus, the bushing 68 will be pulled into its proper position before the flange 44 contacts the forward end of nut 91. As shown by FIGS. 4 and 5 in the drawing, and as also shown by FIGS. 6 and 7 in the aforementioned U.S. Pat. No. 5,103,548, as mandrel 10 is retracted, first the increasing diameter portion 56 and then the maximum diameter portion 58 of the mandrel 10 move through the split sleeve 66. As they move, portions 56, 58 enlarge the diameter sleeve 66. In the process, sleeve 66 imposes a radially outwardly directed force on the bushing 68. This expands bushing 68 and moves its outer surface into tight contact with the side surface of the opening 88 in member 84. The mandrel 10 and the split sleeve 66 are dimensioned such that the radial expansion of the split sleeve 66 exerts sufficient radial forces on the bushing 68 to plastically expand the bushing 68 and create a tight interference fit between the outer surface of the bushing 68 and the sidewall of the opening 88, to in this manner securely anchor the bushing 68 within the opening 88. As shown by FIG. 5 in the drawing, and also by FIG. 6 in U.S. Pat. No. 5,103,548, when the maximum diameter portion 58 of mandrel 10 is within split sleeve 66, the diameter of mandrel portion 58 is in effect increased by an amount equal to twice the thickness of the sidewall of split sleeve 66. In order for mandrel portion 58 to move axially through sleeve 66, the sleeve 66 must expand in diameter and the increment of diameter expansion must be transmitted to the bushing 68. The increment of diameter expansion is calculated to provide an amount of plastic expansion of the bushing 68 sufficient to secure the bushing 68 within opening 88.

As shown by FIG. 5, and also by FIG. 6 and 7 of U.S. Pat. No. 5,103,548, when the increasing diameter and maximum diameter portions 56, 58 of mandrel 10 enter into the sleeve positioner 40, the sleeve positioner 40 increases in diameter at its outer end while maintaining the contact between its end surface 78 and the end surface 76 of the expanded sleeve 66. The presence of the longitudinal slits 46 allow the segments 48 to bend outwardly, like leaf springs, in response to the movement of mandrel portions 56, 58 into the tubular sleeve positioner 40, while continuing to grip the mandrel 10. As previously stated, an annular passageway 90 initially exists in the tubular body of nosepiece 16, around the axially split tubular portion 42 of sleeve abutment 40. This space 90 provides expansion room into which the segments 48 move as they bend outwardly.

At the completion of the movement of mandrel 10 through sleeve 66, the puller tool and the mandrel 10 are moved away from the sleeve 66 and the member 84. Then, the sleeve 66 is removed from within the bushing 68, leaving bushing 68 within the opening 88.

The apparatus and method which have been described permit the operator to install the bushing 68 within the opening 88 from the first side of the member 84. The limited axial movement provided for sleeve positioner 40 results in a substantially automatic proper placement of bushing 68 within the opening 88.

The preferred embodiment which has been illustrated and described is presented to provide a better understanding of the invention but is not to by itself limit the scope of protection. The scope of protection is to be determined by the claims which follow, constructed in accordance with established rules of patent claim construction, including use of the doctrine of equivalents.

What is claimed is:

1. A method of installing a tubular bushing in a circular opening extending between first and second sides of a structural member, said circular opening having a cylindrical sidewall, said method comprising:

providing a puller tool which includes an elongated tubular nosepiece having a forward end, an elongated tubular sleeve positioner within the nosepiece having an axially split forward end portion and a sleeve contacting forward end, and a mandrel having, in series, an inner end portion, a small diameter portion, an increasing diameter portion, and a maximum diameter portion, said mandrel extending through the sleeve positioner;

extending the mandrel so that the small diameter portion of the mandrel is within the sleeve positioner, the axially split forward portion of the sleeve positioner is gripping the small diameter portion of the mandrel, and the increasing diameter portion, the maximum diameter portion and a part of the small diameter portion of the mandrel project endwise outwardly from the sleeve positioner and the nosepiece;

providing a one-piece split sleeve and positioning such sleeve on the projecting part of small diameter portion of the mandrel;

providing a tubular bushing having a substantially constant outside diameter and a substantially constant inside diameter, said outside diameter being sized to snugly fit into the opening in the structural member, and said inside diameter being sized to pass the maximum diameter portion of the mandrel and the split sleeve when the split sleeve is on the small diameter portion of the mandrel;

sizing the sleeve positioner so that it grips the small diameter portion of the mandrel, and sizing the sleeve so that when it is on the small diameter portion of the mandrel it frictionally engages the small diameter portion of the mandrel, and sizing the bushing so that when it is on the split sleeve and the split sleeve is on the small diameter portion of the mandrel, the bushing frictionally engages the split sleeve;

inserting the mandrel, the split sleeve and the bushing into the opening in the structural member, with the split sleeve within the bushing;

positioning the nosepiece against the structural member;

pulling on the inner end of the mandrel to initially move the sleeve positioner, the sleeve and the bushing rearwardly, until the end of the bushing confronting the nosepiece is in contact with said nosepiece;

stopping movement of the sleeve positioner and holding the sleeve positioner against further axial movement, following movement of the bushing into contact with the nosepiece;

continuing retraction of the mandrel axially to move first the increasing diameter portion and then the maximum diameter portion of the mandrel axially through the split sleeve, for expanding the split sleeve radially and imposing a radially outwardly directed expansion force on the bushing for expanding the bushing within said opening;

wherein the mandrel and the split sleeve are dimensioned such that the radial expansion of the split sleeve exerts sufficient radial forces on the bushing to plastically expand the bushing and place the sidewall of the opening into tight gripping contact with the outer surface of the bushing; and removing the split sleeve from the bushing after the mandrel has passed through the split sleeve, leaving the tubular bushing within said opening, firmly secured by the expansion to the sidewall of the opening.

2. The method according to claim 1, wherein said nosepiece has an outer end configured to provide an end surface that contacts against the structural member, immediately surrounding the circular opening, and also an end surface against the confronting end of the bushing.

3. A method according to claim 2, wherein the end surface against the bushing is offset axially into the opening from the end surface that contacts the structural member.

4. Apparatus for installing a tubular bushing in a cylindrical opening in a member, said opening extending through the member from a first side to a second side, said bushing having an inside diameter, a first end and an outside diameter sized to snugly fit within said opening, said apparatus comprising:

a mandrel having in series an inner end portion, a small diameter portion, an increasing diameter portion, and a maximum diameter portion, said maximum diameter portion being sized to fit through the bushing;

a one-piece split sleeve having an inside diameter sized to fit on the small diameter portion of the mandrel, and an outside diameter sized to fit through the bushing when the split sleeve is on the small diameter portion of the mandrel;

wherein in use the bushing is inserted into the opening in said member, the split sleeve is on the small diameter portion of the mandrel and is within the bushing; and means for holding the bushing and split sleeve against endwise movement while forcing the mandrel endwise, to move first the increasing diameter portion and then the maximum diameter portion of the mandrel axially through the split sleeve, for expanding the split sleeve radially and imposing a radially outwardly directed force on the bushing, for expanding the bushing within said opening;

wherein the mandrel and the split sleeve are so sized that the radial expansion of the split sleeve exerts sufficient radial force on the bushing to plastically expand the bushing and place the sidewall of the opening into tight fitting contact with the outer surface of the bushing, whereby following movement of the mandrel through the split sleeve to expand the bushing to secure it in the opening, the split sleeve is removed form the bushing;

wherein the means for holding the bushing and split sleeve against endwise movement comprises a nosepiece through which the mandrel extends, said nosepiece having an annular bushing abutment which surrounds the mandrel and is directed towards a confronting end of the bushing, and an end surface in contact with said member;

said means for holding including a sleeve stop within said nosepiece, wherein said sleeve stop is an axially split tubular member having an outer end which makes abutting contact with the sleeve; and wherein the sleeve stop is movable axially back and forth within said nosepiece, between front and rear positions said sleeve stop being sized to frictionally grip the small diameter portion of the mandrel, so that the sleeve stop is moved between its front and rear positions by movement of the mandrel.

* * * * *

UNITED STATES PATENT AND TRADEMARK OFFICE
CERTIFICATE OF CORRECTION

PATENT NO. : 5,341,559
DATED : August 30, 1994
INVENTOR(S) : Leonard F. Reid and Roger T. Bolstad It is certified that error appears in the above-indentified patent and that said Letters Patent is hereby corrected as shown below:

Claim 4, column 8, line 56, there is a comma after "positions".

Signed and Sealed this

Thirteenth Day of June, 1995

Attest:

BRUCE LEHMAN

Attesting Officer     Commissioner of Patents and Trademarks